June 25, 1968 B. M. PAUL 3,389,724
SAW GUIDE
Filed June 27, 1966 2 Sheets-Sheet 1
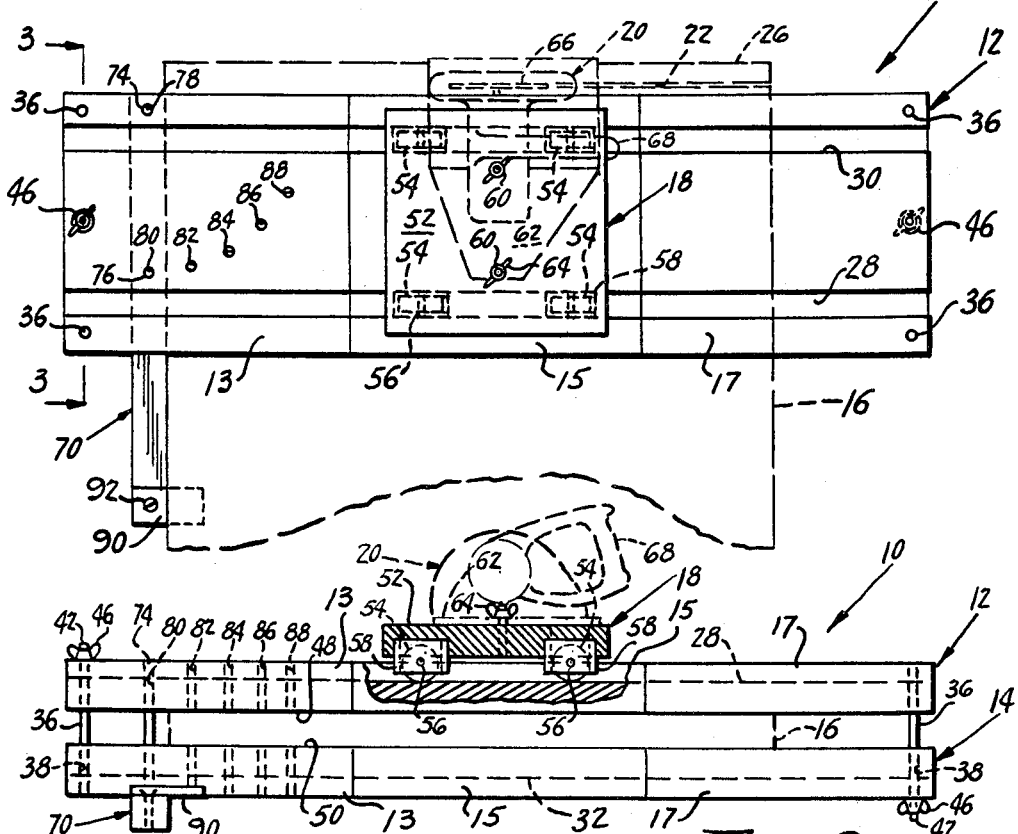
Fig.1
Fig.2
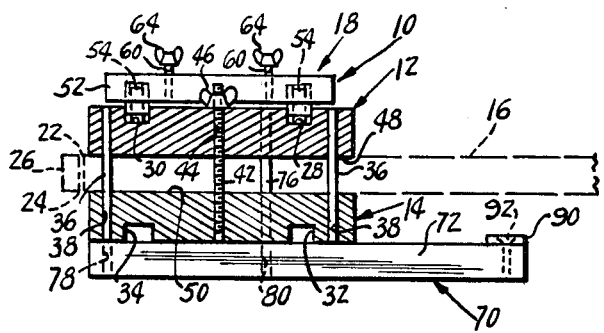
Fig.3
INVENTOR.
BRYANT M. PAUL
BY Kimmel, Crowell & Weaver
ATTORNEYS.

INVENTOR.
BRYANT M. PAUL
BY Kimmel, Crowell & Weaver
ATTORNEYS.

United States Patent Office 3,389,724
Patented June 25, 1968

3,389,724
SAW GUIDE
Bryant M. Paul, 6830 Silverthrone Circle,
North Highlands, Calif. 95660
Filed June 27, 1966, Ser. No. 560,567
9 Claims. (Cl. 143—160)

This invention relates to a saw guide, and more particularly to a device for accurately guiding a power saw across a work piece.

Saw guide devices are, of course, well known in the prior art to provide a guide means for a hand-pushed power saw. One difficulty that has been found in the use of prior art saw guides lies in the area of producing a finished work piece that is not splintered by the action of the saw. For example, when a carpet has been laid on a floor, the doors often must have a portion of the bottom removed in order to clear the newly installed carpet. If this type of work is done with an ordinary power saw, or with a power saw and guide means of the prior art, one side of the door is invariably splintered since the saw makes a full cut therethrough, thereby detracting from the appearance of the door. If such a disadvantage is desired to be obviated, workmen equipped with tools of the prior art generally must plane the bottom of the door which can, of course, take a considerable length of time if a substantial portion is to be removed from the door bottom.

In accordance with the principles of the instant invention, a work piece may be cut to avoid splintering thereof by affixing the guide means of the instant invention to both sides of the work piece, utilizing one plate of the guide means to prescribe a predetermined path for the saw thereby cutting a groove in the work piece about one-half the thickness thereof, and then turning the work piece over and using the other guide plate to cut a second groove aligned with the first groove to sever the undesired portion from the work piece. In utilizing the saw guide means of the instant invention, the cutting blade is not required to cut through the work piece in one pass thereby obviating the customary splintering on the underside of the work. Although it should be understood that the application of the instant invention is not so limited, it has been found particularly desirable in cutting construction material that will be seen from both sides to produce a finished product that is free from the normally occurring damage when the saw cuts through the entire thickness of the work.

In brief terms, the instant invention comprises a pair of saw guiding plates spaced apart for receiving the work therebetween, aligned guide means formed on the plates, means for securing the plates to the work, and means releasably engaged with the guide means on the first plate for carrying a power saw in a predetermined path for cutting a first groove in the work with the saw carrying means being removable from the first plate and engageable with the second plate guide means for cutting a second groove in the work aligned with the first groove.

It is an object of the instant invention to provide a guide means for power saws which allows cuts to be made on opposite sides of the work without removing and readjusting the guide means.

Another object of the instant invention is to provide a power saw guide providing a guide means on opposite sides of the work whereby a saw may be run along one of the guide means, the work turned over and the saw being run along the second guide means on the opposite side of the work without having to readjust or remove the saw guide.

Still another object of the instant invention is to provide a saw guide having an alignment arm extending outwardly away from the guide to adjust the position of the guide with respect to the work.

Still another object of the instant invention is to provide a power saw guide means and alignment arm of the character described in which the alignment arm may be adjusted from a normal right angle position to an acute angle position to vary the trace of the cut with respect to one edge of the work.

A further object of the instant invention is to provide a power saw guide which is inexpensive to manufacture, convenient to use and which allows a conventional power saw to form a finished cut on a work piece.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of the instant inventive concept.

In the drawings:

FIGURE 1 is a top plan view of the saw guide means of the instant invention illustrated as receiving a work piece shown in dashed lines;

FIGURE 2 is a side elevational view of the device of FIGURE 1, certain parts being broken away for clarity of illustrations;

FIGURE 3 is a transverse cross-sectional view of the device of FIGURES 1 and 2 taken substantially along line 3—3 of FIGURE 1 as viewed in the direction indicated by the arrows;

Figure 4:
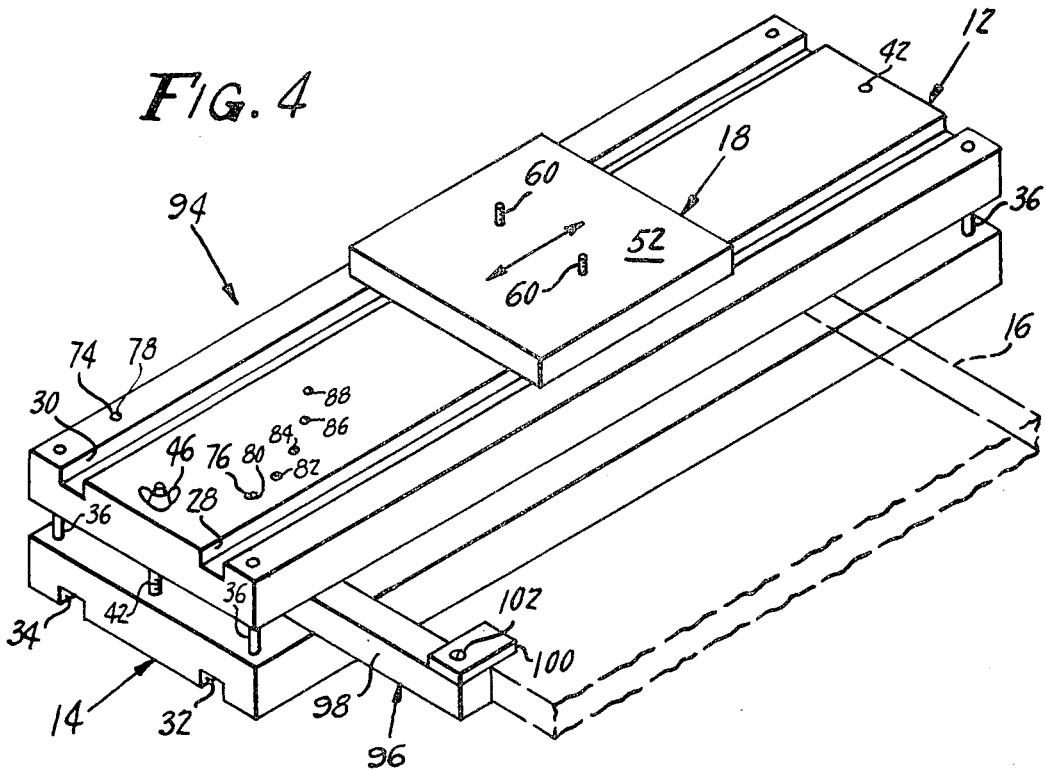
FIGURE 4 is an isometric view of another embodiment of the instant invention illustrating the cooperation between the separation guide forming plates, the saw carrying dolly and the work piece.

Referring now to the drawings in detail, wherein like reference characters designate like elements throughout the several views thereof, the saw guide of the instant invention is shown generally at 10 comprised of a pair of vertically spaced plates shown generally at 12, 14 receiving a work piece 16, such as a door or the like therebetween, and a dolly shown generally at 18 for carrying a power saw shown generally at 20. In the use of saw guide 10, plates 12, 14 will be secured together thereby firmly receiving work piece 16 therebetween. The operator then secures saw 20 to dolly 18 and propels dolly 18 and saw 20 along the guides formed by plate 12 to cut a first groove 22 in the work. After groove 22 has been formed along one side of work 16, saw 20 is de-actuated followed by the removal of dolly 18 and saw 20 from plate 12. The operator then turns saw guide 10 and work piece 16 over without adjusting or removing guide 10. The operator then places dolly 18 and saw 20 on plate 14 and actuates saw 20 to form a second groove 24 in work 16 aligned with first groove 22 to sever the undesired segment 26 from work piece 16.

Plates 12, 14 may be made from any suitable material, such as wood, plastic, metal or the like, and form suitable guide means, illustrated as grooves 28, 30 in plate 12 and grooves 32, 34 in plate 14. As shown in FIGURE 3, grooves 28, 32 are vertically aligned as are grooves 30, 34. An important, though optional, feature of plates 12, 14 is that they are made of a plurality of segments 13, 15, 17 releasably secured together in any conventional manner such as by the use of interfitting joints or releasable fasteners. When the work piece is of great width, a center segment, identical to segment 15, may be inserted to elongate measuring device 10. It will be seen that a good deal of flexibility is thereby provided.

Although plates 12, 14 may be secured together in any suitable manner, a plurality of pins 36 are illustrated as perpendicularly fixedly secured to plate 12 and slidably received in openings 38 formed in plate 14. A threaded shank 42 is fixedly secured to plate 14 and extends upwardly through a non-threaded opening 44 in plate 14 with a wing nut 46 threadably received on the upper end thereof. It will be readily apparent that the insertion of door 16 between plates 12, 14, followed by the tightening of wing nuts 46 will fixedly secure work piece 16 therebetween and thereby place it perpendicular to align grooves 28, 32 and 30, 34, since the abutting faces 48, 50 of plates 12, 14 are perpendicular to grooves 28, 30, 32, 34.

Dolly 18 is illustrated as including a platform 52 rotatably carrying a plurality of wheels 54 journaled by pins 56 extending through depending walls 58 secured to platform 52. A pair of upstanding threaded shanks 60 are fixedly embedded in platform 52 and pass through a bottom plate 62 of saw 20 with wing nuts 64 acting to secure saw 20 on platform 52. Since saw 20 is such that blade 66 extends outwardly beyond the edges of plates 12, 14, it will be readily apparent that grooves 22, 24 may be cut in the work.

After it has been decided how much is to be severed from the end of work piece 16, plates 12, 14 may be secured in the appropriate location by tightening wing nuts 46. Dolly 18 is then placed at the right of plate 12 with saw 20 being actuated to rotate blade 66. The operator then grasps handle 68 and forces dolly 18 and saw 20 to the left of plate 12, thereby cutting first groove 22. The operator then shuts off saw 20 and removes dolly 18 from engagement with grooves 28, 30 and then turns plates 12, 14 and work piece 16 over to expose guide grooves 32, 34 of plate 14. The operator then places wheels 54 of dolly 18 in grooves 32, 34 and positions dolly 18 on the right side of plate 14. After actuating saw 20, the operator pushes dolly 18 to the right thereby cutting second groove 24, which is illustrated in FIGURE 3 as aligned with groove 22 to sever segment 26 from work piece 16. Since the guide grooves of plates 12 and 14 are vertically aligned, it will be readily apparent that saw guide 10 need not be readjusted nor removed during the cutting operation. Since saw blade 66 effects only a partial cut through work piece 16 on any given pass, it will be seen that the splintering that normally occurs when the saw exits through the work is obviated.

Saw guide 10 is preferably provided with a straight edge shown generally at 70 to facilitate the marking of the work preparatory to the cutting operations. Straight edge 70 is illustrated as including an elongate shank 72 extending beneath plate 14. Shank 72 is secured to guide 10 by a pair of removable pins 74, 76, frictionally held in apertures 78, 80 extending through plates 12, 14 and shank 72. A plurality of apertures 82, 84, 86, 88 are formed in plates 12, 14 on an arc about aperture 78 such that straight edge 70 may be positioned at an acute angle to vary the cut along the lower edge of work piece 16.

The terminal end of shank 72 carries an offset 90 secured thereto by a suitable fastener 92. Straight edge 70 is arranged for use prior to the securement of guide 10 to work piece 16 and for placement away from the work during the actual cutting operation as shown in FIGURE 3. Prior to the securement of guide 10 to work piece 16, shank 72 is placed along one side of the work with offset 90 residing above and in contact with the upper surface of work piece 16. Since the operator sets straight edge 70 at the angle necessary to produce the desired angle of cut, the operator may take pencil and mark along the straight side of plate 14 to draw the trace of saw blade 66. Work 16 is then secured between plates 12, 14 with blade 66 aligned with the penciled trace.

Figure 5:
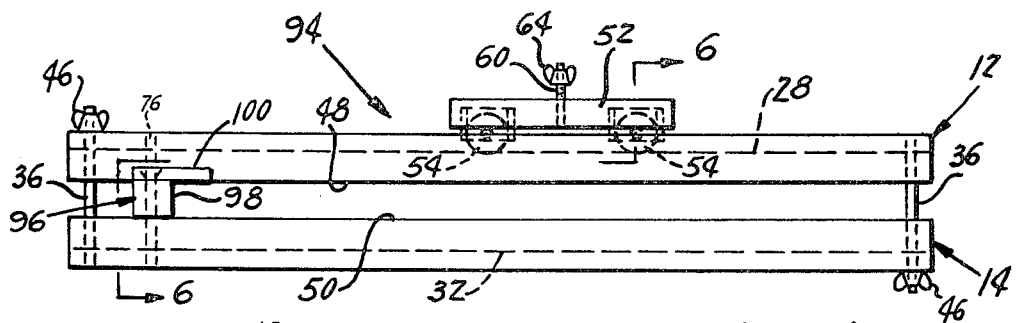
FIGURE 5 is a side elevational view, similar to that of FIGURE 2, illustrating the embodiment of FIGURE 4.
Figure 6:
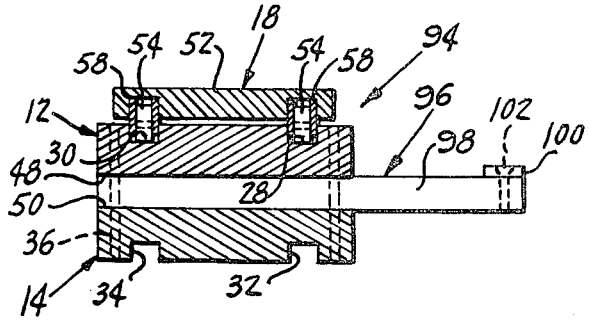
FIGURE 6 is a transverse cross-sectional view of the device of FIGURE 5 taken substantially along line 6—6 thereof as viewed in the direction indicated by the arrows.

Referring now to FIGURES 4 to 6 inclusive, another embodiment of the saw guide of the instant invention is illustrated generally at 94 and is substantially the same as the embodiment of FIGURES 1 to 3 except for the difference in the location of the straight edge. Accordingly, like reference characters will be used to designate the components of saw guide 94 for purposes of brevity. Saw guide 94 is provided with a straight edge shown generally at 96 comprised of an elongate shank 98 and an offset plate 100 secured thereto by a fastener 102. Shank 98 is received between plates 12, 14 by pins 74, 76 frictionally received in apertures 78, 80 extending through plates 12, 14 and shank 98.

It should be noted that shank 98 is rather thin such that in almost all instances, the work piece will be thicker than shank 98 such that the work contacts surfaces 48, 50 of plates 12, 14. When using straight edge 96, work piece 16 is placed between plates 12, 14 with shank 98 abutting one edge of the work. Wing nuts 46 are then tightened to secure work piece in place. Dolly 18 and saw 20 are then utilized to sever a desired portion of work piece 16 as in the previous embodiment. It should also be noted that straight edge 96 may be secured solely to plate 12 in a manner shown in United States Patent No. 2,942,633.

It is now seen that there is herein provided an improved saw guide which accomplishes all of the objects and advantages of the instant invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:
1. A saw guide comprising
   a pair of saw guiding plates spaced apart for receiving the work therebetween, each plate having at least one guide means aligned with guide means on the other plate;
   means for securing the plates to the work;
   means, releasably engaged with the guide means on the first plate, for carrying a power saw in a predetermined path for cutting a first groove in the work, the carrying means being removable from the first plate and engageable with the second plate guide means for cutting a second groove in the work aligned with the first groove.
2. The saw guide means of claim 1 wherein the saw carrying means includes
   a dolly having means for affixing the saw thereto; and
   means, on the dolly, releasably engaging the guide means for transporting the saw along the predetermined path.
3. The saw guide means of claim 2 wherein the transporting means includes a plurality of wheels.
4. The saw guide means of claim 3 wherein the plates form at least one groove, the grooves comprising the guide means.
5. The saw guide means of claim 1 further including a straight edge and means mounting the straight edge at right angles to the plates.
6. The saw guide means of claim 5 wherein the mount- ing means includes means for angularly adjusting the straight edge.

7. The saw guide means of claim 5 wherein the straight edge is affixed to one of the plates.

8. The saw guide of claim 5 wherein the straight edge is positioned between the plates.

9. The saw guide of claim 1 wherein the plates comprise a plurality of segments and means releasably connecting the segments together for varying the size of the guide to fit the work.

References Cited

UNITED STATES PATENTS

| 1,360,604 | 11/1920 | Wallace | 143—167 |
| 2,630,147 | 3/1953 | Garberg | 143—47 |
| 3,168,126 | 2/1965 | Konopka | 143—86 XR |

WILLIAM W. DYER, Jr., *Primary Examiner.*

W. D. BRAY, *Assistant Examiner.*